US008744494B2

(12) United States Patent
 Jalali

(10) Patent No.: US 8,744,494 B2
(45) Date of Patent: Jun. 3, 2014

(54) SATELLITE OPTIMIZED AIR INTERFACE

(75) Inventor: Ahmad Jalali, Rancho Santa Fe, CA (US)

(73) Assignee: Qualcomm Incorporated, San Diego, CA (US)

( * ) Notice: Subject to any disclaimer, the term of this patent is extended or adjusted under 35 U.S.C. 154(b) by 1425 days.

(21) Appl. No.: 11/757,852

(22) Filed: Jun. 4, 2007

(65) Prior Publication Data

US 2008/0057863 A1    Mar. 6, 2008

Related U.S. Application Data

(60) Provisional application No. 60/810,544, filed on Jun. 2, 2006.

(51) Int. Cl.
*H04W 24/00* (2009.01)
*H04B 7/19* (2006.01)

(52) U.S. Cl.
USPC ........... 455/457; 370/316; 370/320; 370/321; 370/328; 370/329; 455/13.2

(58) Field of Classification Search
USPC .......... 370/316, 320–321, 328–329; 455/427, 455/13.2
See application file for complete search history.

(56) References Cited

U.S. PATENT DOCUMENTS

| | | | | |
|---|---|---|---|---|
| 5,822,311 | A * | 10/1998 | Hassan et al. | 370/322 |
| 6,680,986 | B1 * | 1/2004 | Hemmati | 375/341 |
| 6,850,533 | B2 | 2/2005 | Gerszberg et al. | |
| 7,079,505 | B2 | 7/2006 | Okunishi et al. | |
| 7,403,470 | B2 | 7/2008 | Lane et al. | |
| 7,623,859 | B2 * | 11/2009 | Karabinis | 455/427 |
| 7,701,901 | B2 * | 4/2010 | Anderson et al. | 370/329 |
| 7,783,958 | B1 * | 8/2010 | Eidson et al. | 714/780 |
| 8,200,149 | B1 * | 6/2012 | Chen | 455/12.1 |
| 2001/0048672 | A1 * | 12/2001 | Okunishi et al. | 370/316 |
| 2003/0142664 | A1 * | 7/2003 | Gerszberg et al. | 370/354 |
| 2004/0085976 | A1 * | 5/2004 | Dale et al. | 370/411 |
| 2006/0155840 | A1 * | 7/2006 | Giffin et al. | 709/224 |
| 2006/0285481 | A1 * | 12/2006 | Lane et al. | 370/208 |
| 2007/0232330 | A1 * | 10/2007 | Ranganathan | 455/458 |

FOREIGN PATENT DOCUMENTS

| | | |
|---|---|---|
| EP | 0568291 | 11/1993 |
| WO | 0022753 | 4/2000 |
| WO | 02084476 | 10/2002 |

OTHER PUBLICATIONS

International Search Report—PCT/US07/070131—International Search Authority—European Patent Office—Dec. 14, 2007.
Written Opinion—PCT/US07/070131—International Search Authority—European Patent Office—Dec. 14, 2007.

* cited by examiner

*Primary Examiner* — Jinsong Hu
*Assistant Examiner* — Qun Shen
(74) *Attorney, Agent, or Firm* — Abdollah Katbab

(57) ABSTRACT

A method is disclosed for establishing communication links in a satellite based wireless communication system. The method includes: establishing a forward link from the satellite to at least one of a plurality of subscriber wireless communication devices (WCDs) by use of a shared frequency multi-user communication protocol; applying an error correction code to use in the forward link, whereby the error correction applies to an aggregation of communications provided to multiple ones of the WCDs; and receiving communications in a return link signal by use of a protocol providing channels having dedicated frequency assignments and non-slotted channel assignment.

26 Claims, 6 Drawing Sheets

SATELLITE OPTIMIZED AIR INTERFACE

CLAIM OF PRIORITY UNDER 35 U.S.C. §119

The present Application for Patent claims priority to Provisional Application No. 60/810,544 entitled, SATELLITE OPTIMIZED AIR INTERFACE, filed Jun. 2, 2006, and assigned to the assignee hereof and hereby expressly incorporated by reference herein.

BACKGROUND

Field

The present invention relates generally to wireless communication systems, and more particularly to a system capable of communicating between a terrestrial subscriber wireless communication device and a satellite.

Various satellite communication systems have been developed over the years. One early system architecture is referred to as Time Division Multiple Access (TDMA) and is characterized by assignment of time slots in a communication channel to each of a plurality of terminals, and with communication with the terminals taking place in the specifically assigned time slots. An improved system architecture is referred to as Code Division Multiple Access (CDMA). CDMA based communication systems generally provide greater bandwidth efficiency than do TDMA based communication systems.

Wireless communication systems are widely deployed to provide various types of communication such as voice and data. A typical wireless data system, or network, provides multiple users access to one or more shared resources. A system may use a variety of multiple access techniques such as frequency division multiplexing (FDM), time division multiplexing (TDM), code division multiplexing (CDM), and others. Examples of wireless networks include cellular-based data systems. The following are several such examples: (1) the "TIA/BIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the 18-2000 standard), and (4) the high data rate (HDR) system that conforms to the TIA/EIA/IS-856 standard (the IS-856 standard). The HDR system is implemented in the CDMA communication standard 1xEv-DO.

The 1xEv-DO system utilizes a time-division multiplexed forward link. The forward link may comprise multiple time-division multiplexed channels, such as: a Pilot Channel, a Forward Medium Access Control (MAC) Channel, and a Forward Traffic Channel or Control Channel. The Traffic Channel carries user data packets, and the Control Channel carries control messages, although it may also carry user traffic. No predetermined time slots are allocated to users.

A mobile station utilizing one of the CDMA standards utilizes a set of reverse channels to transmit data to the infrastructure and a set of forward channels to receive data from the infrastructure. Reverse channels include but are not limited to an Access Channel and one or more Traffic Channels. The Access Channel is used by mobile stations for communicating usually short messaging signals to a specific base station, where such signals include but are not limited to call originations, responses to infrastructure pages and system registrations. The various Access Channel messages typically comprise a message body, a message length indicator and a cyclic redundancy check (CRC). Access Channel messages are contained in a data structure called an Access Probe. An Access Probe typically comprises a preamble and an Access Channel message. Access Probes are sent in sequences containing the same message until an acknowledgement to the message is received. A mobile station will usually increase the power of each successive Access Probe until it receives an acknowledgment to the message or the access parameters affecting transmit power are modified by the base station.

In general, signal strength is a critical factor in establishing a communication link with good quality of service (QoS). In the ease of satellite communications with multiple subscribers, the signal strength provided to subscribers' wireless communication devices (WCDs) from the satellite, and from the WCDs to the satellite, is limited. In addition, satellite coverage area is divided into plural beams, which are of limited geographical area.

If it can be determined which beam coincides with a WCD's physical location, the communication can be established within that beam. For the purposes of this description, the beam to which the WCD is assigned is the primary beam. Other WCDs are assigned beams as primary beams, so that this description of the primary beam is dependent on the location of a particular WCD with which an air link is established. In other words, the reference to a "primary beam" is dependent on which WCD is being described in connection with the communication and is dependent on the physical location of that WCD. A beam may be directed to an area comprising more than one WCD.

It should be noted that a satellite is not only in communication with a WCD, but may be in communication with a gateway, which feeds the satellite packets which are to be delivered to one or more WCDs, and which receives communication from the WCD by way of the satellite and delivers it to a recipient device.

SUMMARY

A method is disclosed for establishing communication links in a satellite based wireless communication system. A forward link is established from the satellite to at least one wireless communication device (WCD) by use of a shared frequency multiuser communication protocol. An error correction code is applied to use in the forward link, whereby the error correction applies to an aggregation of communications provided to multiple WCDs. Communications are received in a return, link signal by use of a protocol providing channels having dedicated frequency assignments and non-slotted channel assignments.

In some aspects, access probes are received from one of the WCDs on an access channel in a return link. In some aspects, a narrowband discrete frequency channel is provided as the dedicated frequency assignment. In some aspects, an assigned narrowband frequency channel is used for receiving signals on the return link. In some aspects, the forward link is implemented according to a time-slotted communication protocol. In some aspects, an access channel is provided in the form of a CDMA access channel. In some aspects, forward signals are transmitted in accordance with a CDMA communication protocol generally described by the 1xEv-DO communication standard. In some aspects, dedicated narrowband channels for traffic and wideband CDMA communications as access probe communication are received as transmissions in the return link. In some aspects, dedicated narrowband channels for traffic and narrowband access probe communication are received as transmissions in the return link.

In some aspects, forward signals are transmitted in accordance with a CDMA communication protocol generally described by the 1xEv-DO communication standard; dedicated narrowband channels for traffic and wideband CDMA communication as an access probe are received as transmissions in the return link; and a slotted scheme is provided as transmissions in the forward link, whereby multiple user data are multiplexed and sent on a wide bandwidth.

In some aspects, forward signals are transmitted in accordance with a CDMA communication protocol generally described by the 1xEv-DO communication standard; dedicated narrowband channels for traffic and narrowband ALOHA type communication as an access probe are received as transmissions in the return link; and a slotted scheme is provided as transmissions in the forward link, whereby multiple user data are multiplexed and sent on a wide bandwidth.

A method is also disclosed for using a WCD to communicate with a satellite. A forward link is established from a received transmission in a shared communication channel. Error correction is applied to an aggregate of communications in the shared communication channel with an error correction code. An assigned logical communication channel is parsed from the shared communication channel as a forward link communication. A further return communication link is established in a discrete communication channel.

In some aspects, access probes are generated in a forward link. In some aspects, a narrowband channel is selected as the discrete communication channel. In some aspects, an assigned narrowband frequency channel is used for transmitting traffic signals on the forward link. In some aspects, the forward link is received according to a time-slotted communication protocol. In some aspects, the access probes are provided on the forward link in the form of a wideband CDMA access channel. In some aspects, the access probes are provided on fee forward link in the form of a narrowband ALOHA type access channel. In some aspects, forward signals are received in accordance with a CDMA communication protocol generally described by the 1xEv-DO communication standard. In some aspects, forward link transmissions are provided in dedicated narrowband channels for traffic; and wideband CDMA access probe communication is provided in the forward link transmission.

In some aspects, communications are received in accordance with a CDMA communication protocol generally described by the 1xEv-DO communication standard; and dedicated narrowband channels are transmitted for traffic and wideband CDMA communication as a forward, link access probe.

In some aspects, communications are received in accordance with a CDMA communication protocol generally described by the 1xEv-DO communication standard; and dedicated narrowband channels are transmitted for traffic and narrowband ALOHA type communication as a forward link access probe.

In some aspects, a machine readable medium comprises instructions for performing the disclosed method of using a WCD to communicate with a satellite.

In some aspects, a processor comprises circuitry for performing the disclosed method of using a WCD to communicate with a satellite, where the processor is provided as a monolithic integrated circuit.

In some aspects, a processor comprises circuitry for performing the disclosed method of using a WCD to communicate with a satellite, where the processor is provided as a chipset.

A WCD capable of communicating with a satellite is also disclosed. The WCD includes a receiver capable of establishing a forward link from a received transmission in a shared communication channel; an error correction circuit capable of applying error correction code to an aggregate of communications in the shared communication channel; a logic circuit capable of parsing an assigned logical communication channel from the shared communication channel as a forward link communication; a transmitter capable of establishing a return communication link in a discrete communication channel; and a circuit, capable of generating access probes in a forward link in association with fee received communication.

In some aspects, the receiver receives the forward link according to a time-slotted communication protocol. In some aspects, the transmitter transmits the access probes on the forward link in the form of a wideband CDMA access channel. In some aspects, the transmitter provides the access probes on the forward link in the form of a narrowband ALOHA type access channel. In some aspects, the receiver receives forward signals in accordance with a CDMA communication protocol generally described by the 1xEv-DO communication standard. In some aspects, the receiver receives communications in accordance with a CDMA communication protocol generally described by the 1xEv-DO communication standard; and the transmitter transmits dedicated narrowband channels for traffic and wideband CDMA communication as a forward link access probe. In some aspects, the receiver receives communications in accordance with a CDMA communication protocol generally described by the 1xEv-DO communication standard; and the transmitter transmits dedicated narrowband channels for traffic and narrowband ALOHA type communication as a forward link access probe.

A system for establishing communication links in a satellite based wireless communication system is also disclosed. The system includes means for establishing a forward link from the satellite to at least one of a plurality of subscriber wireless communication devices (WCDs) by use of a shared frequency multiuser communication protocol; means for applying an error correction code to use in the forward link, whereby the error correction applies to an aggregation of communications provided to multiple ones of the WCDs; means for receiving communications in a return link signal by use of a protocol providing channels having dedicated frequency assignments and non-slotted channel assignments; and means for receiving access probes from WCDs on an access channel in a return link.

A system for using a wireless communication device (WCD) to communicate with a satellite is also disclosed. The system includes means for establishing a forward link from a received transmission in a shared communication channel; means for applying error correction to an aggregate of communications in the shared communication channel with an error correction code; means for parsing an assigned logical communication channel from the shared communication channel as a forward link communication; means for establishing a further return communication link in a discrete communication channel; and means for generating access probes in a return link.

BRIEF DESCRIPTION OF THE DRAWINGS

The features, nature, and advantages of the present invention will become more apparent from the detailed description set forth below when taken in conjunction with the drawings in which like reference characters identify corresponding items throughout and wherein.

DETAILED DESCRIPTION OF THE INVENTION

Figure 1:
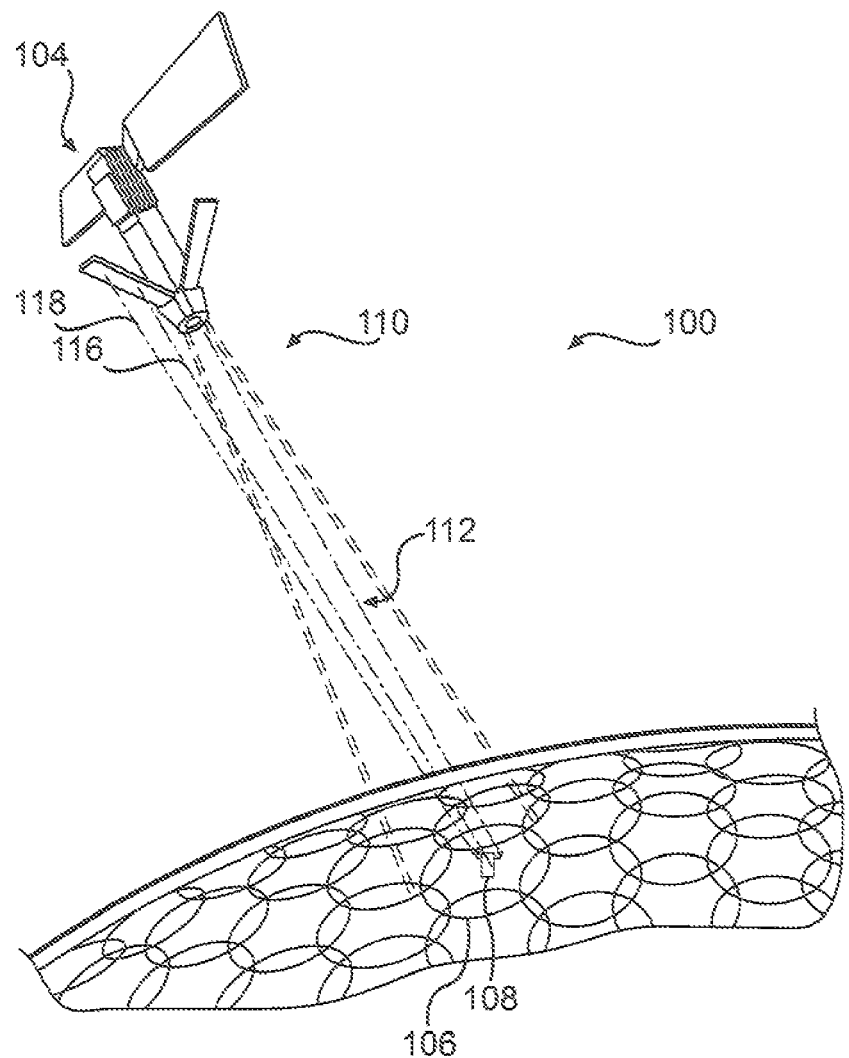
FIG. 1 is a diagram illustrating an operational environment for the present disclosed subject matter.

The detailed description set forth below in connection with the appended drawings is intended as a description of examples of aspects and is not intended to represent the only aspects in which the present invention can be practiced. The term "example" where used throughout this description means "serving as an example, instance, or illustration," and should not necessarily be construed as preferred or advantageous over other aspects. All examples are intended to be "non-limiting." The detailed description includes specific details for the purpose of providing a thorough understanding of the present invention; however, it will be apparent to those skilled in the art that the present invention may be practiced without these specific details. In some instances, well known structures and devices are shown in block diagram form in order to avoid obscuring the concepts of the present invention.

Overview

A typical satellite system uses one or more beams to provide wireless communication coverage to a geographical region. These systems typically use a pattern of signal beams. The signals corresponding to each beam are then processed on the ground to decode the user packets. The satellite may deliver one or more beams toward a user from a fixed point, and may receive signals from the user on the ground.

These systems typically use a signal parameter pattern, in which different set of signal parameters are used for adjacent beams. On the uplink or forward link from the user terminal to the satellite and then to a gateway, the signals in each beam is filtered by the satellite and is transmitted on a backhaul or feeder link from the satellite to a gateway. The signals corresponding to each beam are then processed on the ground to decode the user packets. The signal parameters may be frequency assignments, pseudonoise (PN) codes or other parameters, such that adjacent beams have different signal parameters.

An optimized air interface between a satellite and a wireless communication device (WCD) must account for an optimized forward link (from a satellite to one or more WCDs) and an optimized return link (from a WCD to a satellite). Although called a "return" link, communication can be established in either order. As examples, a WCD may initiate a communication with no previous contact with the satellite, or the satellite may initiate communication with a WCD. The demands for an optimized forward link and return link may differ, as the satellite and WCD differ in available power and in the number of connections which must be sustained.

An optimized air interface for satellite-WCD communication comprises: establishing a forward link from the satellite to at least one of a plurality of subscriber WCDs by use of a shared frequency multiuser communication protocol; applying an error correction code to use in the forward link, whereby the error correction applies to an aggregation of communications provided to multiple ones of the WCDs; and receiving communications in a return link signal by use of a protocol providing channels having dedicated frequency assignments and non-slotted channel assignments.

Operational Environment

FIG. 1 shows an optional operational environment for the presently disclosed inventive subject matter, a satellite based wireless communication system 100 which may be designed to support one or more CDMA standards and/or designs (e.g., the W-CDMA standard, the IS-95 standard, the cdma2000 standard, the HDR specification, the 1xEV-DV standard). In an alternative aspect, system 100 may also deploy any wireless standard or design other than a CDMA system. Satellite 104 may be geostationary (in a geosynchronous orbit, or in a fixed position relative to a nonrooving user on the Earth) or may be in a nongeostationary orbit above the Earth. A wireless communication device 108 is disposed on the Earth in an area 106 serviced by a satellite beam 110. Typically, only one beam is assigned to a given geographic area, although in some aspects one area can be serviced by multiple beams, provided by one or more satellites.

Beam 110 carries forward link 112 to this geographic area 106, where more than one wireless communication device may be provided service. As the forward link typically carries communications for multiple user with WCDs within a single beam 110, it has been found to be advantageous to use time-division multiplexing to take packets of information for multiple users and multiplex these packets into a single frame. Each frame is then transmitted to all of these users at once.

Time-division multiplexing may be implemented in a time-slotted communication protocol. One example of such a protocol is a CDMA communication protocol as generally described by the 1xEv-DO communication standard, but other standards are known and could be used, including, but not limited to: the IS-95 standard, the W-CDMA standard, and the IS-2000 standard. Time-division multiplexing provides greater flexibility in allocating data rates to a user without needing to adjust the overall bandwidth. Some users multiplexed into a single frame will require high bandwidth at a given time, while it is expected that the remaining users will not require high bandwidth at the same time.

While error-correction coding may be applied individually to each packet or user in the forward link 112, it has been found to be advantageous to apply error correction coding to the entire frame. As the frame consists of a large number of bits (typically much larger than an individual packet), a large error correction coding gain may be achieved. For this to be implemented, the satellite 104 may be capable of applying an error correction code to use in the forward link 112, whereby the error correction applies to an aggregation of communications provided to multiple WCDs.

The WCD 108 should moreover be capable of establishing the forward link 112 in a shared communication channel by parsing an assigned logical communication channel from the shared communication channel. This can be accomplished by a logic circuit disposed at the WCD 108, which uses an assigned pseudonoise signature sequence to parse its assigned communication, although other means for establishing the forward link 112 are known to those skilled in the art and may be useful here. A WCD 108 may be fixed or mobile and may also be called a user terminal, a mobile station, user equipment, or some other terminology. WCD 108 may also be a portable unit such as a cellular phone, a handheld device, a wireless module, a personal digital assistant (PDA), and so on.

One implementation of a multi-beam satellite system uses one or more beams to provide coverage to a geographical region. These systems typically use a signal parameter reuse pattern of K where a given set of signal parameters is used in one out of K beams. These signal parameters are used for, among other reasons, disambiguating signals within beams, and sometimes even across beams. The signals corresponding to each beam are then processed on the ground to decode the user packets. The parameter reuse pattern is particularly useful for a frequency reuse system, in which the frequency assignments are provided in a reuse pattern. The parameter reuse pattern can also be used for pseudonoise (PN) codes or other parameters, in which adjacent beams have different signal parameters, with or without a requirement for reuse of the signal parameters.

It is possible to configure a multi-beam satellite system in which the same frequencies are used in adjacent beams. CDMA communications are particularly adaptable to this type of system, since CDMA can operate at low signal to interference ratios. Therefore, while adjacent beams are typically configured not to reuse a given frequency (thereby avoiding interference between the two beams), in the case of a satellite-WCD forward link, all beams from the satellite travel the same path to get to the WCD. Accordingly, any interference on one beam (as examples, blocking of the beam, reflection of the beam, or attenuation of the beam) will appear to effect all beams equally. Such interference tends to produce a small degradation in signal quality measurements such as the Signal to Interference plus Noise Ratio (SINR) or the Signal to interference Ratio (SIR). Around 100% frequency reuse can provide a signal which is more robust to head blockage and other sources of fading.

Also shown in FIG. 1 is a return link 116 from the WCD 108 to the satellite 104. Each WCD in an area 106 has a return link. As the return link 116 typically uses one beam to carry communications from only one WCD 108 to a satellite 104, and since the satellite 104 is configured to receive multiple beams simultaneously, it may be advantageous to provide orthogonality among the different users communicating with the satellite 104. "Orthogonality" in this sense should by no means be limited to optical orthogonality of the beams (for example, orthogonal polarizations) but includes any manner of signal orthogonality, such that the inner product of the two signals is zero at any given time, or any other means by which one signal can be substantially isolated from any other signal at a given time. Signal orthogonality provides improved signal quality, a higher link budget margin, and the ability to provide WCDs of lower power. Particularly since the distance to the satellite is long, these benefits are highly desirable when communicating from a WCD to a satellite.

One method for achieving signal orthogonality is Orthogonal Frequency Division Multiplexing (OFDM). OFDM is a multi-carrier modulation technique that effectively partitions the overall system bandwidth into multiple (NF) orthogonal subbands. These subbands are also referred to as tones, subcarriers, bins, and frequency channels. Each subband may be associated with a respective subcarrier that may be modulated with data, and thus with an associated traffic channel for wireless communication. Up to NF modulation symbols may be transmitted on the NF subbands in each OFDM symbol period. Prior to transmission, these modulation symbols are transformed to the time-domain using an NF-point inverse fast Fourier transform (IFFT).

Each WCD 108 will typically establish its own return link 116 with a given satellite. In contrast to the forward link 112, fewer frequencies should be reused by adjacent WCDs in the return link 116, because the risk of inter-beam interference is much greater when multiple beams from multiple sources (WCDs) converge at a single location (the satellite). By reducing frequency reuse, inter-beam interference may be minimized, signal quality (such as that measured, by SINR) may be increased, and a higher link budget margin may be achieved. Higher link budget margins allow the transmit power of the WCDs to be reduced.

Accordingly, each return link 116 may be given a dedicated frequency assignment and a non-slotted channel assignment. These assignments are made most often by the satellite 104, but conceivably may be made by the WCD 108 itself. The dedicated frequency assignment may be a narrowband discrete frequency channel, or an assigned narrowband frequency channel, dedicated to communication traffic. Accordingly, the WCD 108 will include a transmitter capable of establishing a return link 116 in a discrete communication channel.

Each return link 116 may also be associated with an access channel 118. This access channel may be a CDMA based access channel. CDMA based access channels are set forth in, for example, the 1xEv-DO standard discussed above. As examples, the access channel can be used to carry access probes, registration information, call signaling, or pseudonoise codes and sequences.

Data carried on the access channel 118 is typically small, allowing the access channel 118 to use a smaller transmit power spectral density than the power spectral density of the traffic channel of return link 116. As an advantage of this design, the low power spectral density, coupled with the high probability that no more than one user at a time will be making an access attempt on the access channel 118, causes the expected interference on the access channel 118 to be about negligible. As a further advantage to this design, the CDMA access channel 118 requires no additional dedicated frequency channel. Once again, the design provides improved signal quality, a higher link budget margin, and the ability to provide WCDs of lower power.

Although a CDMA-based access channel may be optimal in some circumstances, other circumstances may be best served by providing the access channel 118 as a narrowband ALOHA type access channel. The phrase "ALOHA type access channel" is used here to refer to any communication protocol in which one or more senders uses a single channel to send frames of data, and in which a sender sends a subsequent frame upon belief that the previous frame was received, and in which a previous frame may be retransmitted upon belief that this previous frame was not received. The term may include, but is not limited to, systems such as ALOHA, slotted ALOHA, reservation ALOHA, Carrier Sense Multiple Access (CSMA), Carrier Sense Multiple Access with Collision Avoidance (CSMA/CA), Carrier Sense Multiple Access with Collision Detection (CSMA/CD), and Carrier Sense Multiple Access with Bitwise Arbitration (CSMA/BA), or any other narrowband protocol. Again, since data carried on the access channel 118 (such as access probes) are typically small, the collisions and retransmissions of an ALOHA type access channel may be acceptable.

Although not shown, it should be noted that the satellite may be in communication with a gateway, which among other functions delivers the satellite packets which are to be delivered to one or more WCDs, and which receives communication from the WCD by way of the satellite and delivers it to a recipient device. The gateway connects the satellite to a larger telecommunications network. Many gateway implementations may be used with the present invention.

Figure 2:
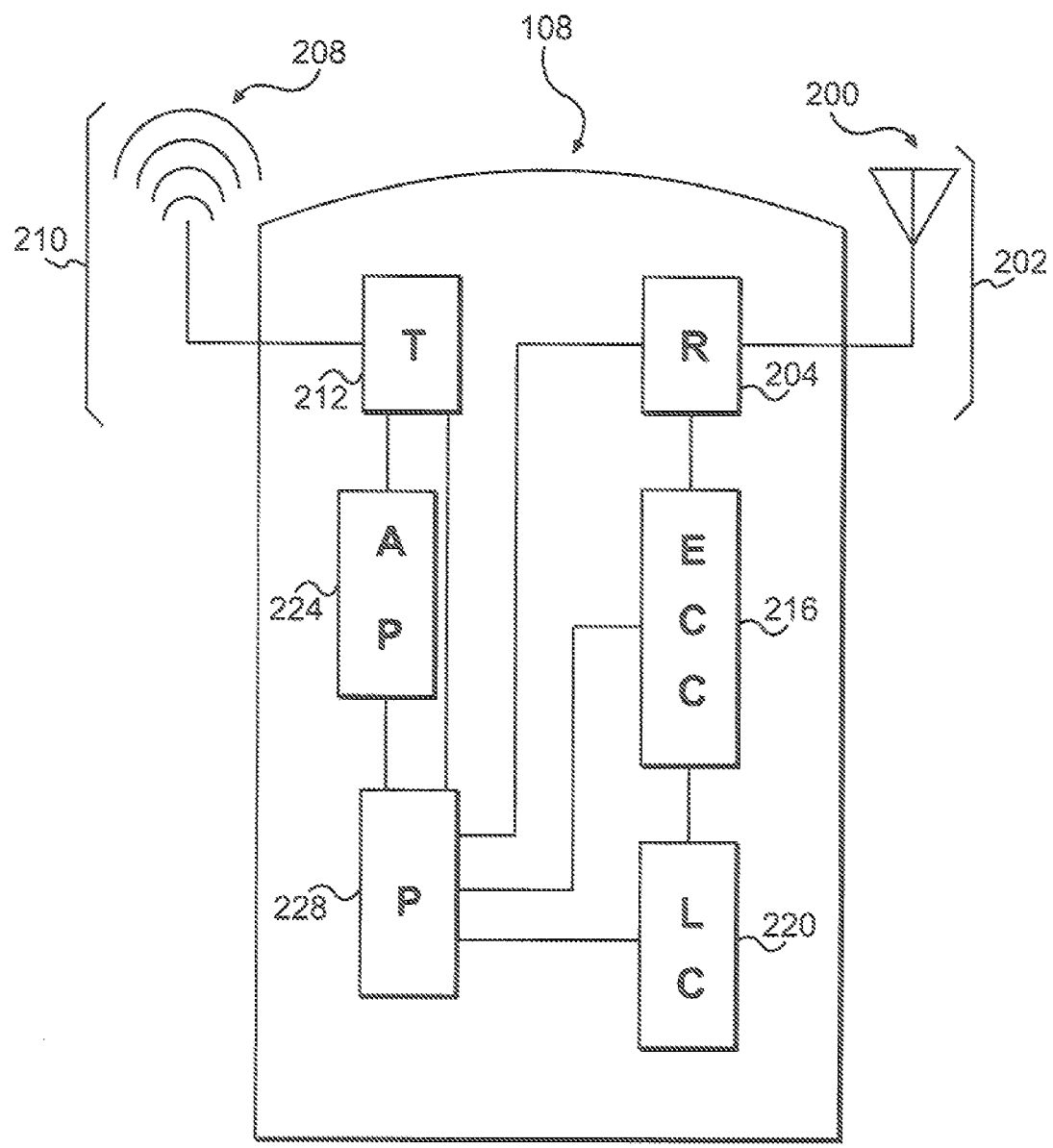
FIG. 2 is a diagram of a wireless communication device according to the present disclosed subject matter.

FIG. 2 shows an example design for a WCD 108 according to the present disclosed invention. The WCD may be an end-user device such as a telephone or "satellite phone," a mobile phone, or a relay station, a large installation at a building, a packet router, or any other device which would advantageously communicate wirelessly with a satellite. The WCD 108 comprises a receiver 202. The receiver 202 includes a receiver circuit 204 capable of establishing a forward link from a received transmission in a shared communication channel. The receiver 202 also includes an antenna 200 configured to receive transmissions from a satellite operating under the disclosed method. The WCD 108 also includes a transmitter 210. The transmitter 210 includes a transmitter circuit 212 capable of establishing a return communication link in a discrete communication channel. The transmitter 210 also includes a broadcaster 208 configured to send transmissions to the satellite.

The receiver 202 is connected to an error correction circuit 216 capable of applying error correction code to an aggregate of communications in the shared communication channel. The error correction code may include a forward error correction (FEC) scheme such as Turbo codes; and/or link-layer retransmissions to repair frames damaged during propagation. These are only examples, and many forms of error correction are applicable to the present design.

The error correction circuit 216 is shown connected to a logic circuit 220 capable of parsing an assigned logical communication channel from the shared communication channel as a forward link communication. The error correction circuit 216 and logic circuit 220 together parse a received signal into user-ready communication. While shown here connected in one order (receiver to error correction circuit to logic circuit), this is merely an example, and logic circuits may be used before, during, or after error correction.

The receiver 202 may be configured to receive the forward link according to a time-slotted communication protocol. As an example, the receiver may receive forward signals in accordance with a CDMA communication protocol, such as one generally described by the 1xEv-DO communication standard.

The transmitter 210 is connected to an access probe circuit 224 capable of generating access probes in a return link in association with the received communication. While shown independent of the logic circuit 220 and the error correction circuit 216, it may be advantageous in some aspects to share these responsibilities across one circuit, or to perform logic or error correction on transmitter signals as well. The transmitter can be configured to transmit the access probes on the return link in the form of a wideband CDMA access channel or a narrowband ALOHA type access channel, or any other advantageous access channel type. Many such access channels are set forth above. Of course, the transmitter transmits not only access probes but also dedicated channels for traffic. These may be the dedicated narrowband channels discussed in detail above.

The WCD 108 may optionally include a processor 228 which connects to the above elements, or which contains instructions to perform one or more of the functions given above. The Processor may provide or carry instructions among the elements.

Figure 3:
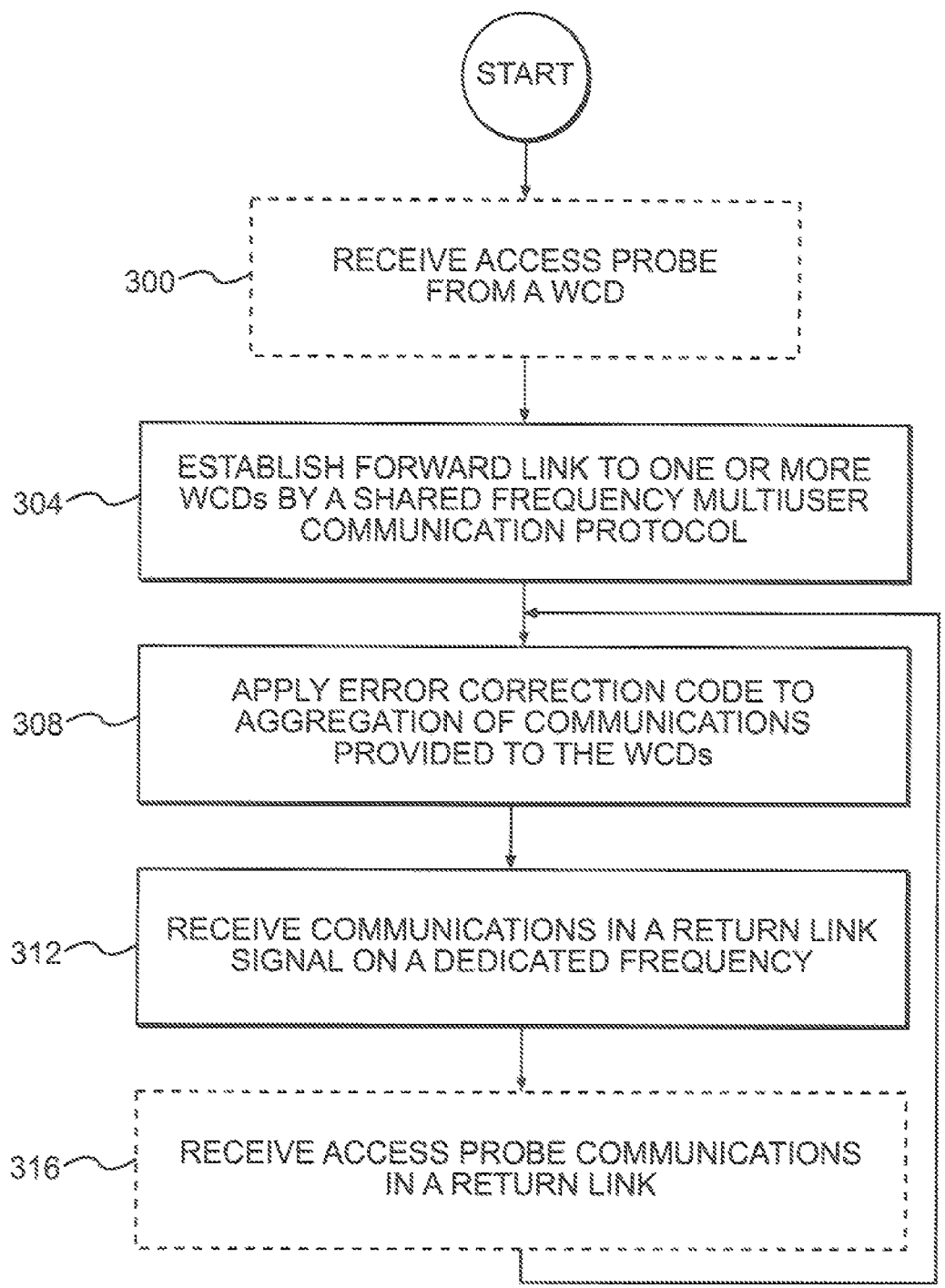
FIG. 3 charts a method according to the present disclosed subject matter.

FIG. 3 charts a method, for establishing communication links in a satellite based wireless communication system. Note that FIG. 3 shows only one example of the order of steps, and that the method can be executed in any order. As an example, the return link can be established before the forward link, or communications may be received in a return link signal (step 312) one or more times before error correction is applied to the aggregation of communications in the forward link (step 308).

The method can be initiated when the satellite receives an access probe from a WCD (step 300). This step is optional, however, as the satellite may initiate communication with a WCD without first receiving an access probe. It should be noted that the access probe may be carried on any channel, and may be carried on a CDMA based or ALOHA type access channel.

A forward link is established from the satellite to one or more WCDs (step 304). The forward link may be established by a shared frequency multiuser communication protocol, as discussed above. The forward link may be implemented according to a time-slotted communication protocol, or any other appropriate protocol. Forward signals may be transmitted signals in accordance with a CDMA communication protocol generally described by the 1xEv-DO communication standard, but other standards may be advantageous whereby multiple user data are multiplexed and sent on a wide bandwidth.

Error correction is applied to an aggregation of communications provided to one or more WCDs in the forward link (step 308). As discussed above, many error correction protocols may be advantageous, where the aggregation of communication increases the total bits over which the error code may be applied, and thereby achieve a large error correction coding gain.

Communications are received in the a return link signal (step 312). The communications may be received by use of a protocol providing channels having dedicated frequency assignments and non-slotted channel assignments, although other protocols may be advantageous for the return link signal, as discussed above. An assigned narrowband frequency channel may be used for receiving signals and/or traffic on the return link.

Additionally, access probe communications may optionally be received in a return link (Step 316). The access channel on which these communications are received may be provided in the form of a CDMA access channel, or on an ALOHA type access channel.

Figure 4:
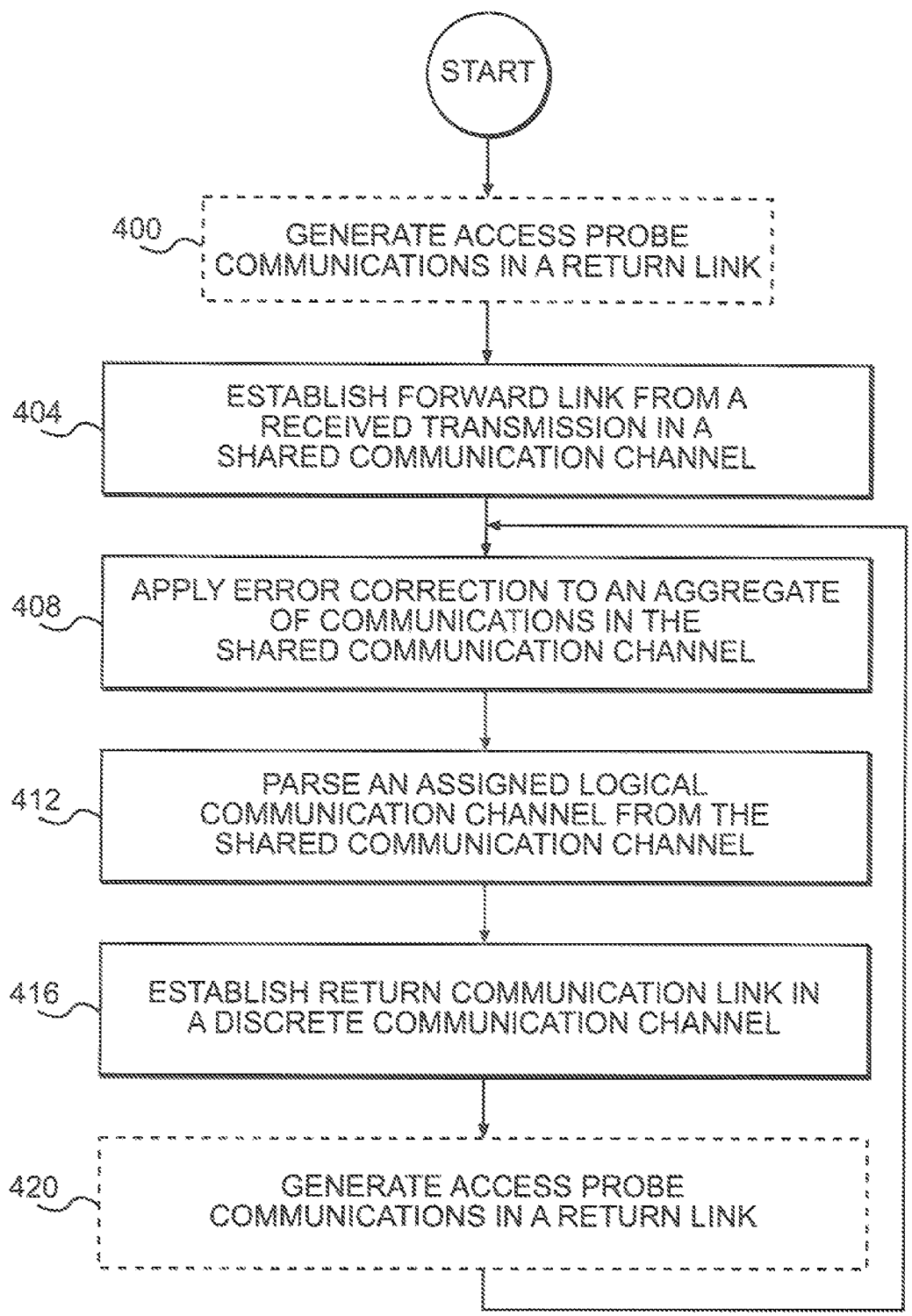
FIG. 4 charts another method according to the present disclosed subject matter.

FIG. 4 charts a method for using a WCD to communicate with a satellite. Note that FIG. 4 too shows only one example of an order of steps, and that the method can be executed in any order. As an example, the return link can be established before the forward link, or a communication link may be established in a return link discrete communication channel (step 416) one or more times before error correction is applied to the aggregation of communications in the forward link (step 408).

The method can be initiated when the WCD generates access probe communications in a return link (step 400). This step is optional, however, as the satellite may initiate communication with the WCD without first receiving an access probe. It should be noted that the access probe may be carried on any channel, and may be carried on a CDMA based access channel or an ALOHA type access channel.

A forward link is established at the WCD from a received transmission in a shared communication channel (step 404). The forward link may be established by a shared frequency multiuser communication protocol, as discussed above. The forward link may be implemented according to a time-slotted communication protocol, or any other appropriate protocol. Forward signals may be transmitted in accordance with a CDMA communication protocol generally described by the 1xEv-DO communication standard, but other standards may be advantageous whereby multiple user data are multiplexed and sent on a wide bandwidth.

Error correction is applied to an aggregation of communications provided to one or more WCDs in the forward link (step 408). An error correction code may be used to check for errors in the received signal. As discussed above, many error correction protocols may be advantageous, where the aggregation of communication increases the total bits over which the error code may be applied, and thereby achieve a large error correction coding gain.

An assigned logical communication channel is parsed from the shared communication channel (step 412). The communications may be received by use of a protocol providing channels having dedicated frequency assignments and non-slotted channel assignments, although other protocols may be advantageous for the return link signal, as discussed above. An assigned narrowband frequency channel may be used for receiving signals and/or traffic on the return link.

A return communication link may then be established in this discrete (assigned logical) communication channel (step 416).

This step may again involve generating access probes in a return link (step 420). The access channel on which these communications are received may be provided in the form of a CDMA access channel or an ALOHA type access channel.

It should be noted again that in all the aspects described above, method steps may be interchanged without departing from the scope of the invention. The descriptions disclosed herein have in many cases referred to signals, parameters, and procedures associated with CDMA standards, but the scope of the present invention is not limited as such. Those of skill in the art will readily apply the principles herein to various other communication systems. These and other modifications will be apparent to those of ordinary skill in the art.

Figure 5:
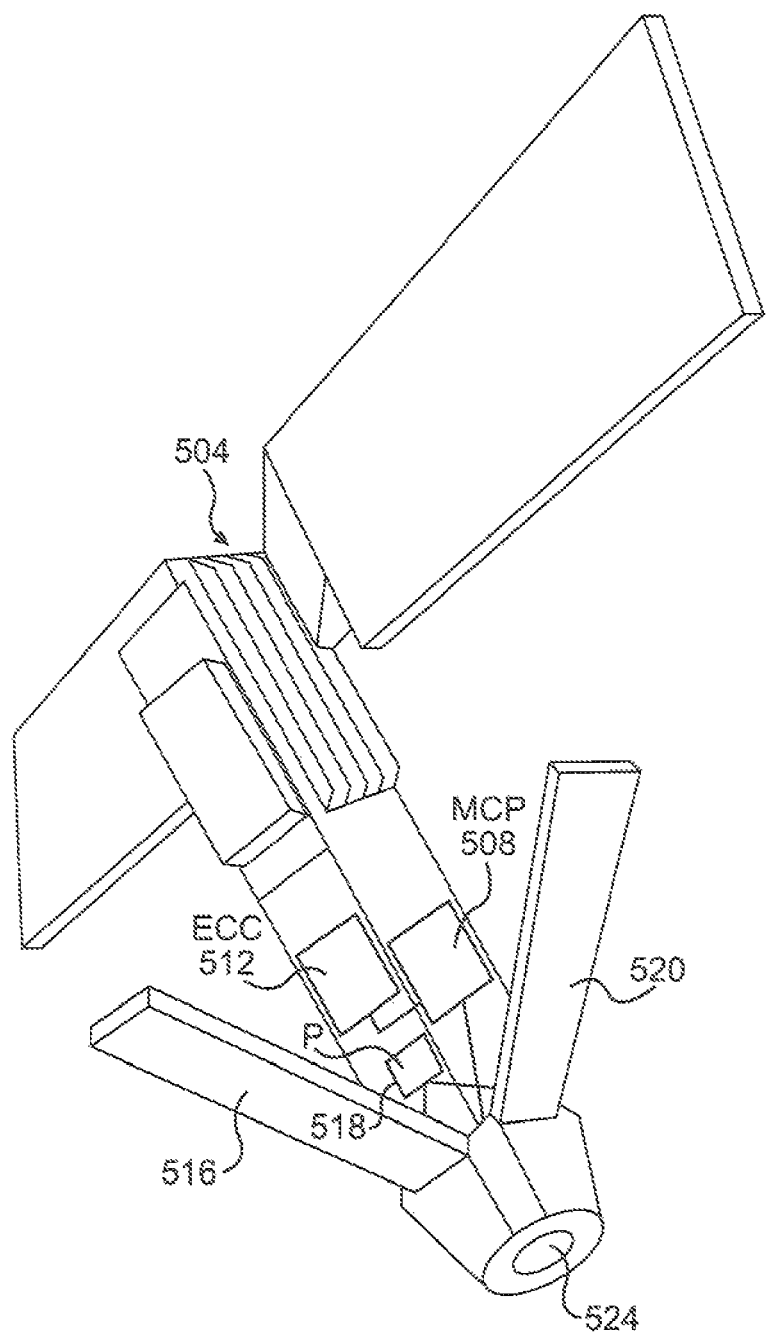
FIG. 5 is an example of a system for establishing communication links in a satellite based wireless communication system according to the present disclosed subject matter.

FIG. 5 is an example of a system for establishing communication links in a satellite based wireless communication system according to the present disclosed subject matter. The system includes means for establishing a forward link from a satellite 504 to at least one of a plurality of subscriber wireless communication devices (WCDs) by use of a shared frequency multiuser communication protocol. As an example, this means could comprise a radio frequency transmitter 524 connected to a microprocessor 508 programmed to apply a multiuser communication protocol. The system also includes means for applying an error correction code to use in the forward link. The error correction applies to an aggregation of communications provided to multiple ones of the WCDs. As an example, this means could comprise a microprocessor 512 programmed to apply an error correction code, connected to the multiuser communication protocol microprocessor 508. The system also includes means for receiving communications in a return link signal by use of a protocol providing channels having dedicated frequency assignments and non-slotted channel assignments. As an example, this means could include an antenna 516 connected to a microprocessor 518 programmed to provide and manage dedicated frequency assignments. The system also includes means for receiving access probes from WCDs on an access channel in a return link. As an example, this means could include an antenna 520 (or antenna 516) connected to the microprocessor 518 programmed to receive and interpret access probes.

Figure 6:
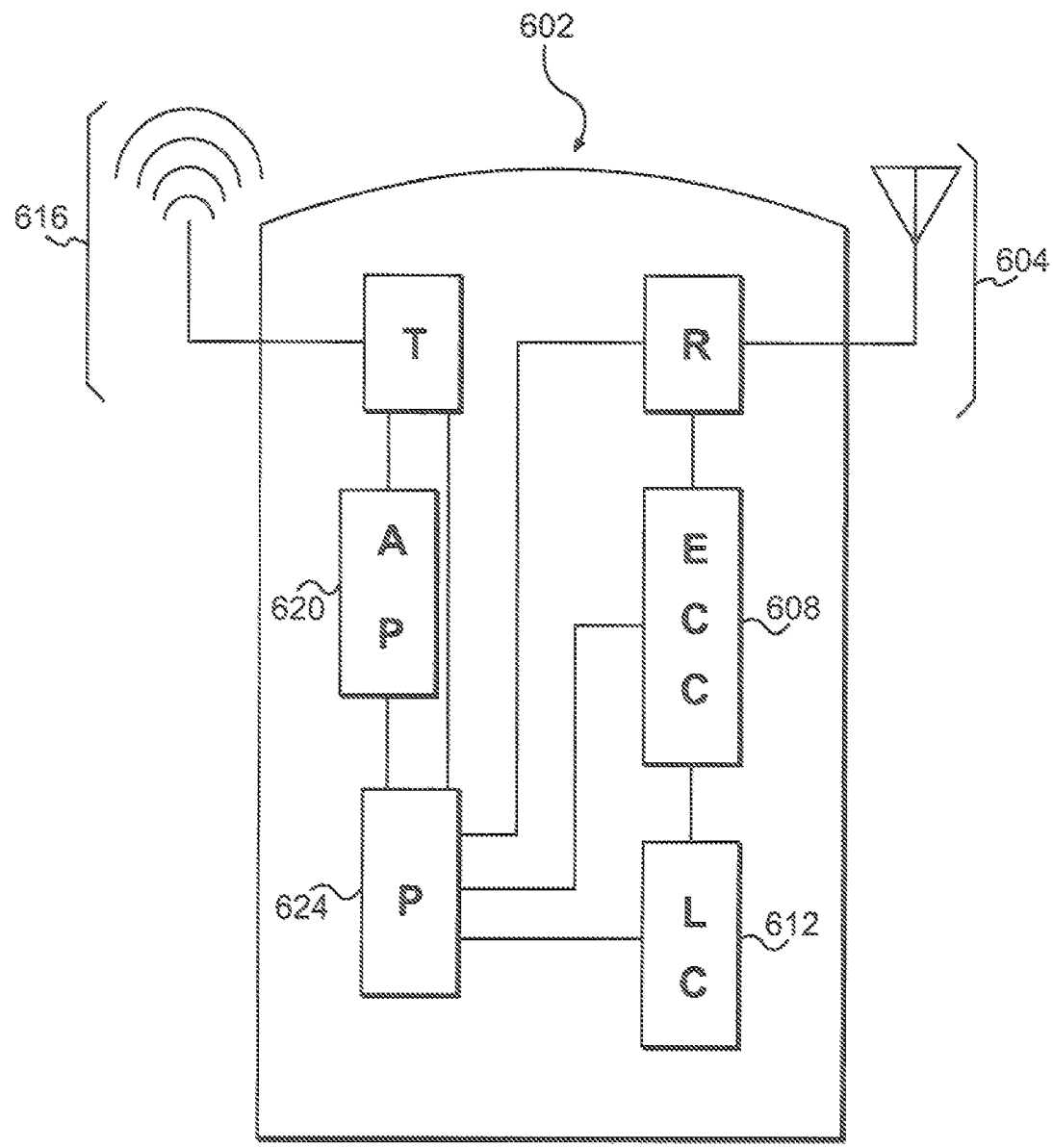
FIG. 6 is an example of a system for using a wireless communication device to communicate with a satellite according to the present disclosed subject matter.

FIG. 6 is an example of a system for using a wireless communication device 602 to communicate with a satellite according to the present disclosed subject matter. The system includes means for establishing a toward link from a received transmission in a shared communication channel. As an example, this means could include both an antenna and a microprocessor in communication and programmed to establish a forward communication link 604. The system also includes means for applying error correction to an aggregate of communications in the shared communication channel with an error correction code. As an example, this means could include a microprocessor 608 programmed to apply error correction to the signals received by means 604. The system also includes means for parsing an assigned logical communication channel from the shared communication channel as a forward link communication. As an example, this means could include a microprocessor 612 programmed to parse the logical communication channel from the signals received by means 604. The system also includes means for establishing a further return communication link in a discrete communication channel. As an example, this means could include a transmitter coupled to a microprocessor programmed to establish a return link 616. The system also includes means for generating access probes in a return link. As an example, this means could include a microprocessor 620 programmed to generate access probes and send them to the return link means 616. Of course any of all of these means may be exemplified by a single processor 624 which executes the programming discussed above.

Those of skill in the art will understand which information and signals may be represented using any of a variety of different technologies and techniques. For example, data, instructions, commands, information, signals, bits, symbols, and chips which may be referenced throughout the above description may be represented by voltages, currents, electromagnetic waves, magnetic fields or particles, optical fields or particles, or any combination thereof.

Those of skill will further appreciate which the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gale or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. "Storage medium" may represent one or more machine readable mediums or devices for storing information. The term "machine readable medium" includes, but is not limited to, wireless channels and various other mediums capable of storing, containing, or carrying instructions and/or data.

The previous description of some aspects is provided to enable any person skilled in the art to make or use the present invention. Various modifications to these aspects will be readily apparent to those skilled in the art, and the generic principles defined herein may be applied to other aspects without departing from the spirit or scope of the invention. For example, one or more elements can be rearranged and/or combined, or additional elements may be added. Further, one or more of the aspects can be implemented by hardware, software, firmware, middleware, microcode, or any combination thereof. Thus, the present invention is not intended to be limited to the aspects shown herein but is to be accorded the widest scope consistent with the principles and novel features disclosed herein.

Having described the invention in detail and by reference to the aspects thereof, it will be apparent that modifications and variations are possible, including the addition of elements or the rearrangement or combination or one or more elements, without departing from the scope of the invention which is defined in the appended claims.

The invention claimed is:

1. In a satellite based wireless communication system, a method for establishing communication links comprising:
    establishing a forward link from the satellite to a plurality of subscriber wireless communication devices (WCDs) by use of a shared frequency multiuser communication protocol;
    applying error correction coding to the forward link, using an aggregation of communications associated with the plurality of subscriber WCDs to provide an error correction code based on the aggregation of communications;
    receiving communications in a return link signal by use of a protocol providing channels having dedicated frequency assignments and non-slotted channel assignments;
    receiving access probes from WCDs on an access channel in a return link;
    transmitting forward signals in accordance with a CDMA communication protocol generally described by the 1xEv-DO communication standard;
    receiving, as transmissions in the return link, dedicated narrowband channels for traffic and at least one of wideband CDMA communication or narrowband ALOHA type communication as an access probe; and
    providing, as transmissions in the forward link, a slotted scheme whereby multiple user data are multiplexed and sent on a wide bandwidth.

2. The method of claim 1, comprising providing, as the dedicated frequency assignment, a narrowband discrete frequency channel.

3. The method of claim 1, comprising using an assigned narrowband frequency channel for receiving signals on the return link.

4. The method of claim 1, comprising implementing the forward link according to a time-slotted communication protocol.

5. The method of claim 1, comprising providing the access channel in the form of a CDMA access channel.

6. The method of claim 1, comprising transmitting forward signals in accordance with a CDMA communication protocol generally described by the 1xEv-DO communication standard.

7. The method of claim 1, comprising receiving, as transmissions in the return link, dedicated narrowband channels for traffic and wideband CDMA communications as access probe communication.

8. The method of claim 1, comprising receiving, as transmissions in the return link, dedicated narrowband channels for traffic and narrowband access probe communication.

9. A method for using a wireless communication device (WCD) to communicate with a satellite, the method comprising:
    establishing a forward link from a received transmission in a shared communication channel;
    receiving a signal including an aggregate of communications in the shared communication channel and an error correction code associated with the aggregate of communications;
    applying error correction to the aggregate of communications in the shared communication channel and the error correction code to check for errors in the received signal;
    parsing an assigned logical communication channel from the shared communication channel as a forward link communication;
    establishing a further return communication link in a discrete communication channel;
    generating access probes in a return link;
    receiving communications in accordance with a CDMA communication protocol generally described by the 1xEv-DO communication standard; and
    transmitting dedicated narrowband channels for traffic and at least one of wideband CDMA communication or narrowband ALOHA type communication as a return link access probe.

10. The method of claim 9, comprising selecting a narrowband channel as the discrete communication channel.

11. The method of claim 9, comprising using an assigned narrowband frequency channel for transmitting traffic signals on the return link.

12. The method of claim 9, comprising receiving the forward link according to a time-slotted communication protocol.

13. The method of claim 9, comprising providing the access probes on the return link in the form of a wideband CDMA access channel.

14. The method of claim 9, comprising providing the access probes on the return link in the form of a narrowband ALOHA type access channel.

15. The method of claim 9, comprising receiving forward signals in accordance with a CDMA communication protocol generally described by the 1xEv-DO communication standard.

16. The method of claim 9, comprising:
    providing return link transmissions, in dedicated narrowband channels for traffic; and
    providing wideband CDMA access probe communication in the return link transmission.

17. A non-transitory machine readable storage medium comprising instructions for performing the method of claim 9.

18. A processor comprising circuitry for performing the method of claim 9, comprising said processor provided as a monolithic integrated circuit.

19. A processor comprising circuitry for performing the method of claim 9, comprising said processor provided as a chipset.

20. A wireless communication device (WCD) capable of communicating with a satellite, the WCD comprising:
   a receiver capable of establishing a forward link from a received transmission in a shared communication channel and capable of receiving a signal, in the shared communication channel, including an aggregate of communications and an error correction code associated with the aggregate of communications;
   an error correction circuit capable of applying error correction to the error correction code;
   a logic circuit capable of parsing an assigned logical communication channel from the shared communication channel as a forward link communication;
   a transmitter capable of establishing a return communication link in a discrete communication channel;
   a circuit, capable of generating access probes in a return link in association with the received communication;
   the receiver receives communications in accordance with a CDMA communication protocol generally described by the 1xEv-DO communication standard; and
   the transmitter transmits dedicated narrowband channels for traffic and at least one of wideband CDMA communication or narrowband ALOHA type communication as a return link access probe.

21. The WCD of claim 20, wherein the receiver receives the forward link according to a time-slotted communication protocol.

22. The WCD of claim 20, wherein the transmitter transmits the access probes on the return link in the form of a wideband CDMA access channel.

23. The WCD of claim 20, wherein the transmitter provides the access probes on the return link in the form of a narrowband ALOHA type access channel.

24. The WCD of claim 20, wherein the receiver receives forward signals in accordance with a CDMA communication protocol generally described by the 1xEv-DO communication standard.

25. In a satellite based wireless communication system, a system for establishing communication links comprising:
   means for establishing a forward link from the satellite to at least one of a plurality of subscriber wireless communication devices (WCDs) by use of a shared frequency multiuser communication protocol;
   means for applying error correction coding to the forward link, using an aggregation of communications associated with the plurality of subscriber WCDs to provide an error correction code based on the aggregation of communications;
   means for receiving communications in a return link signal by use of a protocol providing channels having dedicated frequency assignments and non-slotted channel assignments;
   means for receiving access probes from WCDs on an access channel in a return link;
   means for transmitting forward signals in accordance with a CDMA communication protocol generally described by the 1xEv-DO communication standard;
   means for receiving, as transmissions in the return link, dedicated narrowband channels for traffic and at least one of wideband CDMA communication or narrowband ALOHA type communication as an access probe; and
   means for providing, as transmissions in the forward link, a slotted scheme whereby multiple user data are multiplexed and sent on a wide bandwidth.

26. A system for using a wireless communication device (WCD) to communicate with a satellite, the system comprising:
   means for establishing a forward link from a received transmission in a shared communication channel;
   means for receiving a signal including an aggregate of communications in the shared communication channel and an error correction code associated with the aggregate of communications;
   means for applying error correction to the aggregate of communications in the shared communication channel and the error correction code to check for errors in the received signal;
   means for parsing an assigned logical communication channel from the shared communication channel as a forward link communication;
   means for establishing a further return communication link in a discrete communication channel;
   means for generating access probes in a return link;
   means for receiving communications in accordance with a CDMA communication protocol generally described by the 1xEv-DO communication standard; and
   means for transmitting dedicated narrowband channels for traffic and at least one of wideband CDMA communication or narrowband ALOHA type communication as a return link access probe.

* * * * *